July 4, 1944.  C. WEIDAUER  2,353,096

WORK HOLDER

Filed Sept. 18, 1941

CURTIS WEIDAUER.
INVENTOR

BY Ely Pattison.
ATTORNEYS.

WITNESS:

Patented July 4, 1944

2,353,096

UNITED STATES PATENT OFFICE 2,353,096

WORK HOLDER

Curtis Weidauer, Manhasset, N. Y., assignor to Samuel Briskman, New York, N. Y.

Application September 18, 1941, Serial No. 411,299

3 Claims. (Cl. 90—59)

The present invention relates to improvements in work holders and more particularly it pertains to a means for holding a pinking shears blade blank in order that a serrated cutting edge may be formed thereon by a milling machine of otherwise standard construction.

A pinking shears blade consists of a body portion having a flange extending along one edge thereof and in which a plurality of serrations which form cutting teeth, are formed. The teeth are provided with cutting edges by means of lapping as disclosed in U. S. Letters Patent No. 2,286,874, granted June 16, 1942, for Method of making pinking shears, to one, David L. Schwartz, the teeth themselves being formed by a milling operation.

It is one object of the present invention to provide a novel work holder for firmly holding the blade blank upon the head of a milling machine and yet permit of its ready attachment to and removal from the head.

It is a further object of the invention so to construct the work holder that the work may be removed from the head of the machine without removing the head from the machine.

Figure 1:
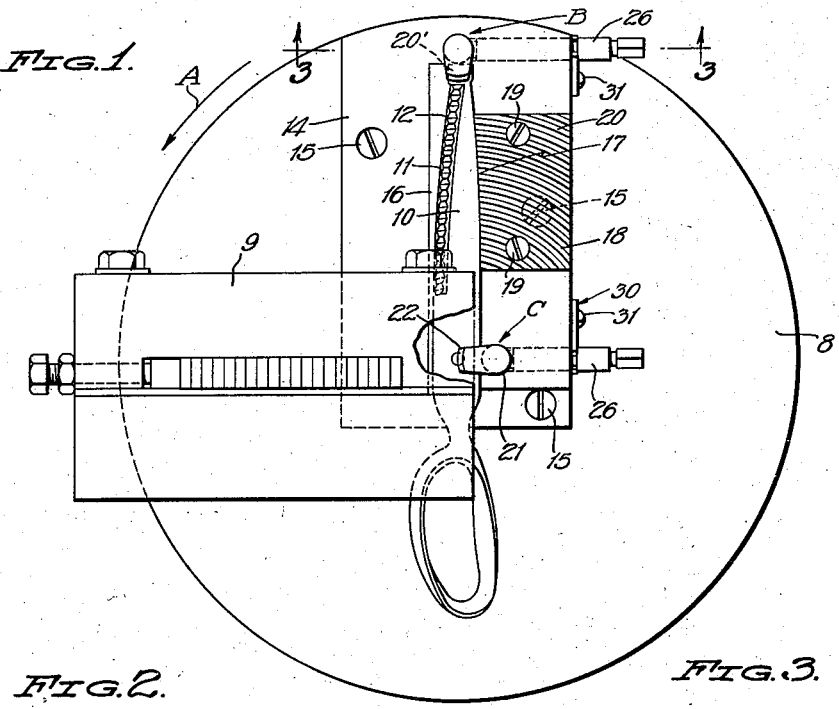
Figure 2:
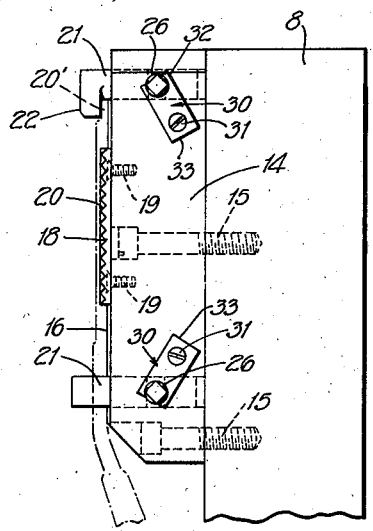
Figure 3:
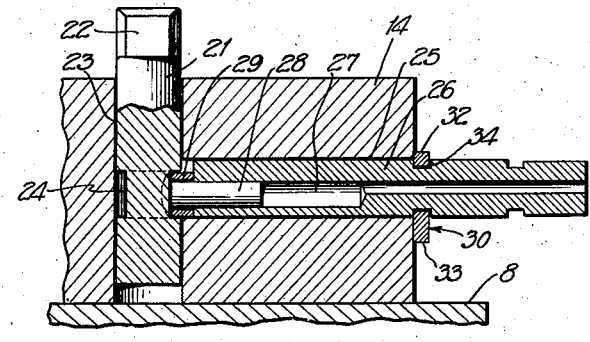
Figure 4:
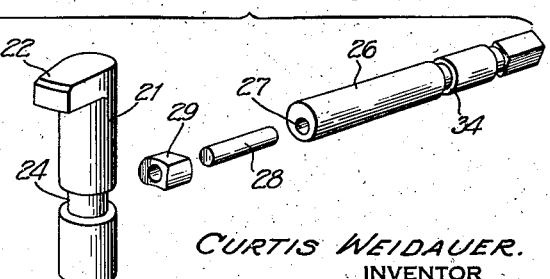
Figure 5:
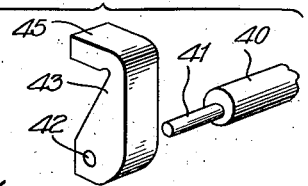

Other objects of the invention will appear as the nature of the invention is better understood and reference will be had to the accompanying drawing in which, Figure 1 is a view in elevation of the head of a rotary head milling machine with a work holder constructed in accordance with the present invention attached thereto, Figure 2 is a view thereof in side elevation, the view being partly broken away, Figure 3 is a sectional view taken substantially on the line 3—3 of Figure 1, Figure 4 is a distended perspective view of one of the blank clamping elements, and;

Figure 5 is a fragmentary perspective view illustrating a modified form of clamping member.

In the drawing the reference character 8 illustrates diagrammatically the head of a rotary head milling machine, the reference character 9 designating a cutter of the type described in my Patent No. 2,289,155, issued July 7, 1942, Serial No. 356,435, filed September 12, 1940, for Tool holder.

The work to be operated upon is, as heretofore stated, a pinking shears blade 10 which includes a flange 11 extending along one edge of the body portion thereof in which a plurality of cutting teeth 12 are formed.

The cutting teeth 12 are formed upon a predetermined arc or curvature and in order to accomplish this result the blade blank is secured to the head 8 of a milling machine, the cutter 9 being suitably mounted on and secured to the bed of such machine.

The holder for the blade blank 10 comprises a substantially rectangular main body portion 14 which is secured to the face of the rotary head 8 by means of a plurality of fastenings 15 in the form of screws, bolts or the like. The work holder 14 has a raised portion 16 upon which the blade blank 10 rests in order to move it into a plane spaced with respect to the plane of the face of the rotary head 8. In operation, the rotary head 8 turns in a counter-clockwise direction as indicated by the arrow A in Figure 1 and means is provided to back up the trailing edge 17 of the blade blank 10 under the strain of the milling operation. This means comprises a block or the like 18 secured to the face of the head 8 by means of screws, bolts or the like 19 and said block 18 is provided with a plurality of arcuate channels 20 which coincide with the cutting teeth of the cutter 9 during the milling operation.

Means is provided to retain the blade blank 10 in position upon the work holder and this means is carried by the work holder and is movable to and from overlying position with respect to the blade blank 10.

One end of the blade blank is provided with a lug or the like 20' shown in dotted lines in Figure 1 and one of the fastening means is adapted to overlie this lug and have clamping engagement therewith. This clamping means comprises a member 21 which is cylindrical in form and it has a radially projecting lug 22 at one end thereof. As best illustrated in Figure 3, the member 21 is rotatably mounted in the boxes 23 in the main body portion of the work holder 14 and intermediate of its ends the member 21 is provided with a continuous channel 24. Rotatably mounted in the bore 25 of the work holder, there is a member 26 which is provided with an eccentric recess 27 in which is mounted a pin 28 upon the inner end of which is carried a cam 29. The member 26 is retained in the bore 25 by means of a key or the like 30 which is secured to the body portion of the work holder by a screw or the like 31 and which is bifurcated to provide two legs 32 and 33 which straddle the member 26 in an annular channel 34 therein. By this construction the member 26 may be rotated within the bore 25 to raise and lower the member 21 by means of rotation of the cam member 29. This construction also permits of rotation of the member 21 in order that its projecting lug 22 may be moved to and from overlying relation with respect to the blade blank 10 carried by the work holder.

The device operates in the following manner. In that form of the invention illustrated in Figures 1 to 4, the work holding devices are of the type just described and as illustrated in Figure 1, there are two of such devices carried by the work holder, one being designated B in said figure, the other being designated C therein.

Assuming that there is no blade blank in position upon the work holder and that the members 21 of the holding means are free to rotate. The members 21 are rotated to position their lugs so that the blade blank 10 may be placed upon the work holder after which the lugs are turned into that position in which they overlie the blade blank, by rotation by the members 21. In this position the members 26 are rotated by a suitable key, wrench or the like to rotate their repsective cam members 29 and force the lugs 22 of the members 21 into holding engagement with the blade blank. By reason of the fact that the members 21 are reciprocated in their bores 23 by the cam member 29, it is obvious that they will be held in that position to which they are moved into holding engagement with the blade blank 10 by their cams 29 until such time as the cams are again rotated to release the holding engagement of the members 21.

In that form of the invention illustrated in Figure 5, there is a member 40 which is substantially of the same construction as the member 26 heretofore mentioned which member carries an eccentrically mounted pin 41 which is adapted to be received within an opening 42 in a hook-like member 43.

This modified form of the invention differs from the form heretofore described in that the actual holding means consists of a swinging or pivoted member such as the hooked member 43, the angular end 45 of which is adapted to move into overlying relation with respect to the blade blank 10 by its pivotal movement and moved into clamping engagement therewith by rotation of the member 40 in the heretofore described manner of operation of the member 26.

From the foregoing it is apparent that the present invention provides a new and improved work holder in which the work may be readily attached to, or removed from the holder in a simple and rapid manner and yet, a construction is provided by which the work may be securely retained in position upon the holder.

While the invention has been herein illustrated in its preferred forms, it is to be understood that it is not to be limited to the specific constructions herein shown and that it may be practiced in other forms without departing from the spirit thereof.

Having thus described the invention what is claimed as new is:

1. A work holder of the type described comprising a main body portion, means for securing the body portion in position in a machine, a work supporting member carried by the body portion, a work clamping element mounted for reciprocating and rotatable movement in the body portion including a work engaging extension movable into and out of overlying relation to a piece of work upon the work supporting member as the work clamping element is rotated and into and out of clamping engagement with a piece of work upon the work supporting member as the clamping member is reciprocated in the work holder, and means for reciprocating the clamping element in the body portion.

2. A work holder of the type described comprising a main body portion, means for securing the body portion in position in a machine, a work supporting member carried by the body portion, a work clamping element mounted for reciprocating and rotatable movement in the body portion including a work engaging extension movable into and out of overlying relation to a piece of work upon the work supporting member as the work clamping element is rotated and into and out of clamping engagement with a piece of work upon the work supporting member as the clamping member is reciprocated in the work holder, and means for reciprocating the clamping element in the body portion and for locking said clamping element in its work clamping position.

3. A work holder of the type described comprising a main body portion, means for securing the body portion in position in a machine, a work supporting member carried by the body portion, a work clamping element mounted for reciprocating and rotatable movement in the body portion including a work engaging extension movable into and out of overlying relation to a piece of work upon the work supporting member as the work clamping element is rotated and into and out of clamping engagement with a piece of work upon the work supporting member as the clamping member is reciprocated in the body portion, and means for reciprocating the clamping element in the body portion and for locking said clamping element in its work clamping position, said means comprising a member rotatably mounted in the body portion, and an eccentric upon the inner end of the rotatable member and operating in a continuous channel in the clamping element.

CURTIS WEIDAUER.